Figure 3:
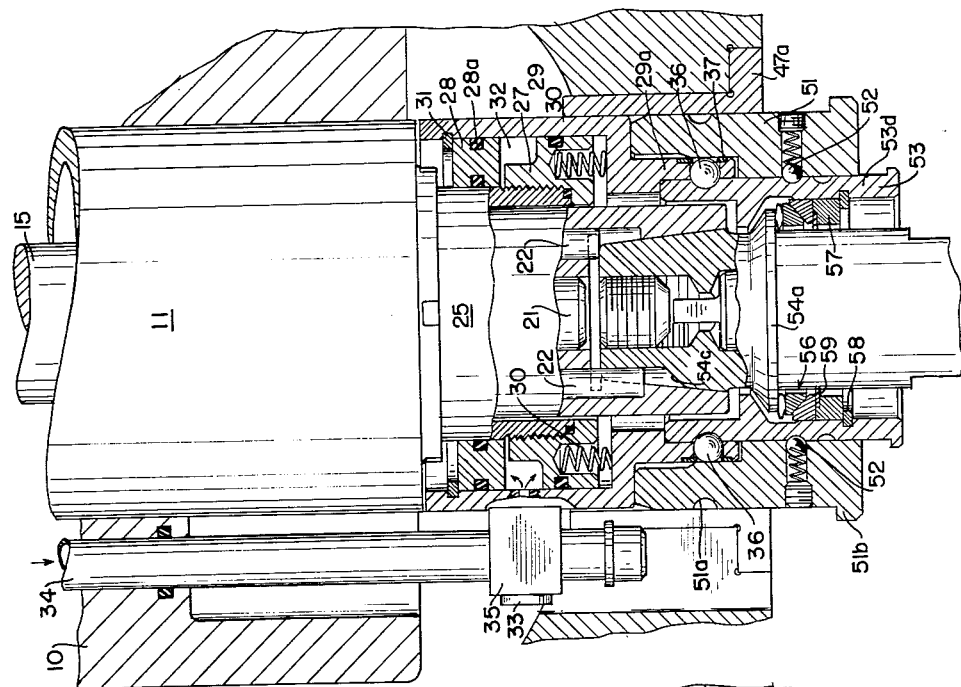

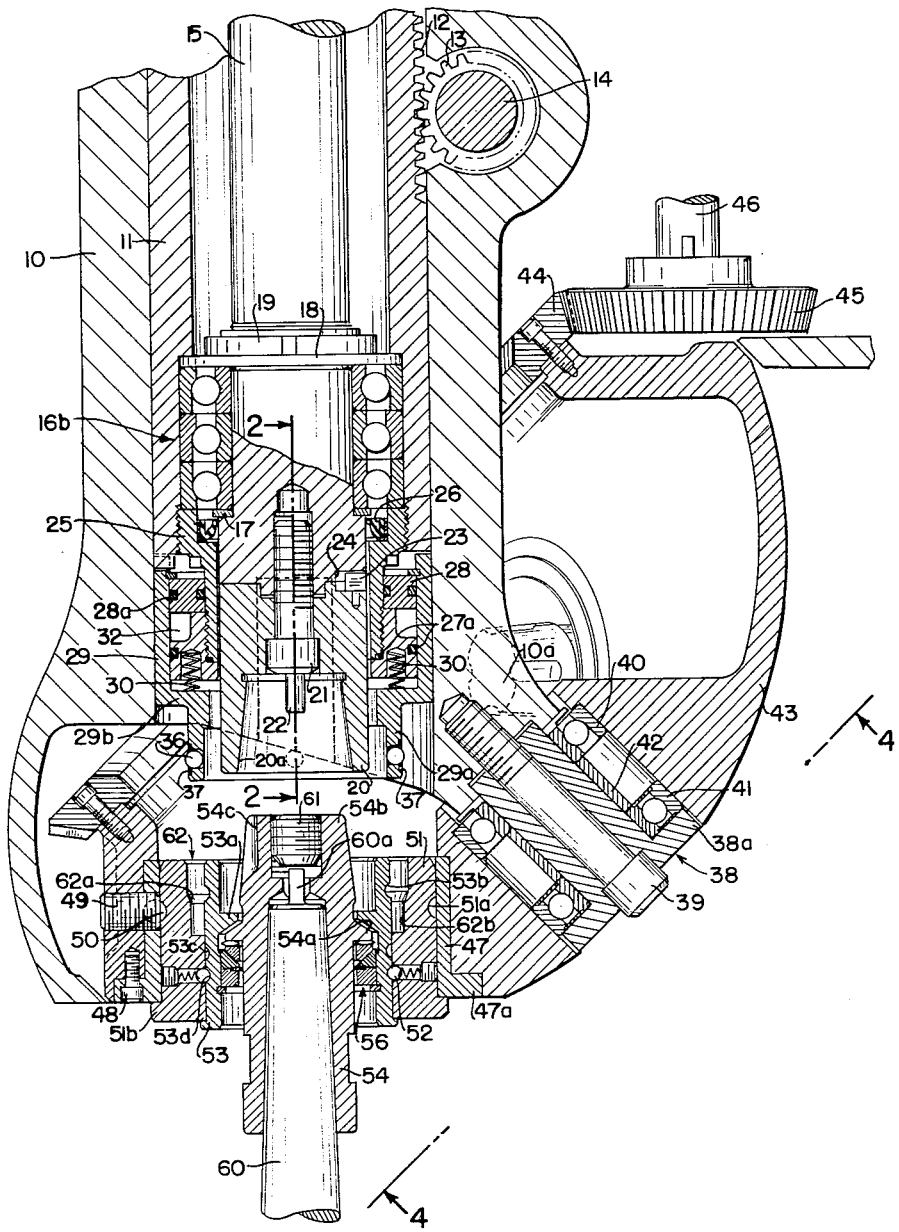

March 6, 1962 A. S. CHARLAT 3,023,677
MACHINE TOOL WITH TOOL CARRIER
Filed Jan. 29, 1960 3 Sheets-Sheet 3
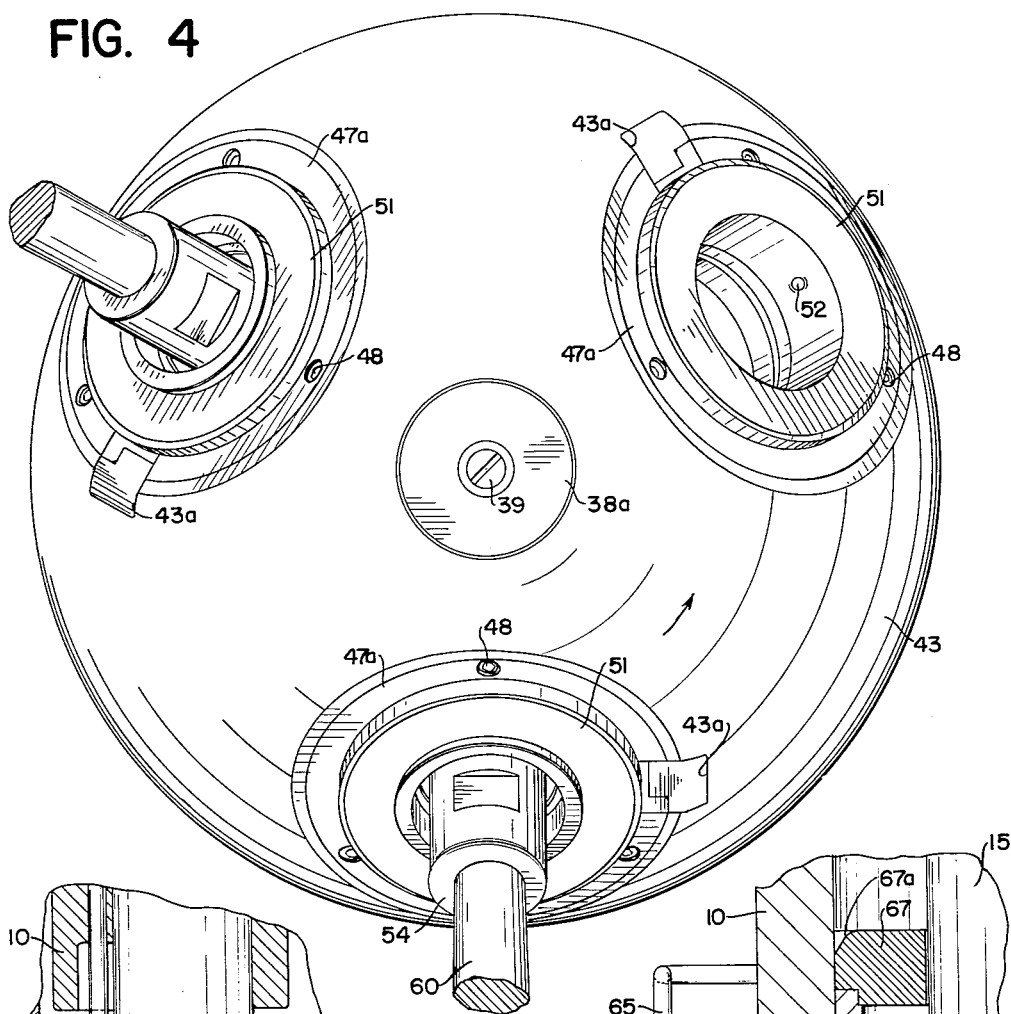
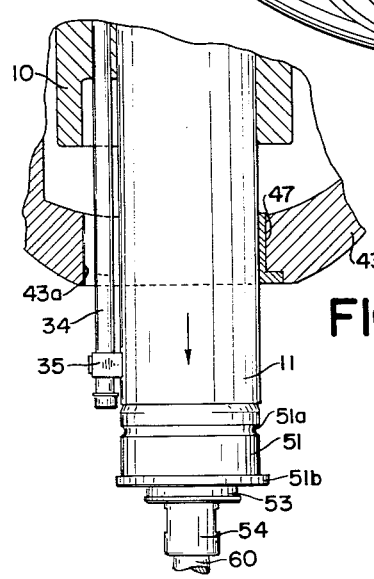
INVENTOR
ARNOLD S. CHARLAT
BY
ATTORNEYS

United States Patent Office 3,023,677
Patented Mar. 6, 1962

3,023,677
MACHINE TOOL WITH TOOL CARRIER
Arnold S. Charlat, Norwalk, Conn., assignor to Brown & Sharpe Mfg. Co., Providence, R.I., a corporation of Rhode Island
Filed Jan. 29, 1960, Ser. No. 5,521
17 Claims. (Cl. 90—17)

This invention relates to machine tools used for performing a number of operations, such as drilling, tapping, milling, etc., on the same workpiece by means of a plurality of tools connectable selectively to the driving spindle of the machine. More particularly, the invention is concerned with a machine tool of the stated type which is provided with novel means, including a movable carrier, for presenting tools successively to the driving spindle and connecting the tool in effective position to the spindle.

Machine tools have heretofore been provided with a rotary turret carrying a plurality of tools to be used successively and a typical prior turret is disclosed in Grimes Patent 2,364,631, issued December 12, 1944. The Grimes turret carries six tool spindle assemblies in bearings in a circular series and it is mounted on the lower end of the quill enclosing the driving spindle and is capable of limited movement lengthwise of the quill and driving spindle. A tapered driving member is mounted on the lower end of the driving spindle beyond the end of the quill and each tool spindle has a tapered driven member mounted on the end of the spindle within the turret and adapted to mate with the driving member to connect the driving and tool spindles. A spring urges the turret in a direction lengthwise of the quill and exerts the force by which the driving and driven members are held in engagement. In order to separate the driving member of a tool in effective position from the driven member on the driving spindle, the quill must be raised to bring the turret into contact with a part of the machine frame, after which the quill must be raised farther to compress the spring. With the quill in its uppermost position, the turret can be rotated to bring a new tool into effective position and, as the quill is lowered, the driving and driven members on the driving and tool spindles are moved into engagement and the turret then descends with the quill until the tool enters the workpiece to the desired depth.

Machine tool turrets typified by that of the Grimes patent carry a limited number of tools and, if the number of operations to be performed on a single workpiece exceeds the number of tools carried by the turret, the workpiece must be transferred to another machine for completion or one or more of the tools mounted in the tool spindle assemblies of the turret must be removed and replaced by others. In the prior turrets, in which the connection between the driving and tool spindles through the mating surfaces of the driving and driven members is maintained by a spring acting on the turret, the spring must be of substantial strength, so that the raising of the quill to compress the spring and disconnect a tool assembly from the main driving spindle subjects the operator to considerable strain and fatigue. Also, since the typical prior turret is mounted on the quill, the weight of the turret must be raised when the quill is moved upwardly and this operation also fatigues the operator.

The present invention is directed to the provision of a machine tool for performing a plurality of operations on the same workpiece and it includes novel means, including a movable carrier, by which an unlimited number of tools may be presented successively to the driving spindle of the machine and connected thereto. The carrier is provided with means for detachably holding a plurality of tool spindle assemblies, each provided with means cooperable with means on the quill to attach the assembly securely to the quill. As the quill is lowered toward the workpiece, the tool spindle assembly in effective position in the carrier is automatically attached to the quill and driving and driven members on the driving spindle and the tool spindle of the assembly are interengaged. Upon farther downward movement of the quill, the attached tool assembly leaves the carrier and is free of the carrier during the performance of the work. When the quill is raised, the assembly is detached therefrom and remains in the carrier, the driving and driven members separating at the same time. The carrier can then be moved to place the next tool assembly in effective position.

In the new machine, the carrier does not support the tool spindle assembly in effective position, while its tool is in use, but merely transfers the assemblies successively to and from effective position. Accordingly, the carrier may take various forms and be mounted for rectilinear or rotary movement. An advantageous form of the carrier is one supported for rotary movement and provided with three mountings for tool spindle assemblies, so that, in each period of rest of the carrier movement, one assembly is in effective position and the other two are at loading and discharge stations, respectively.

Figure 2:
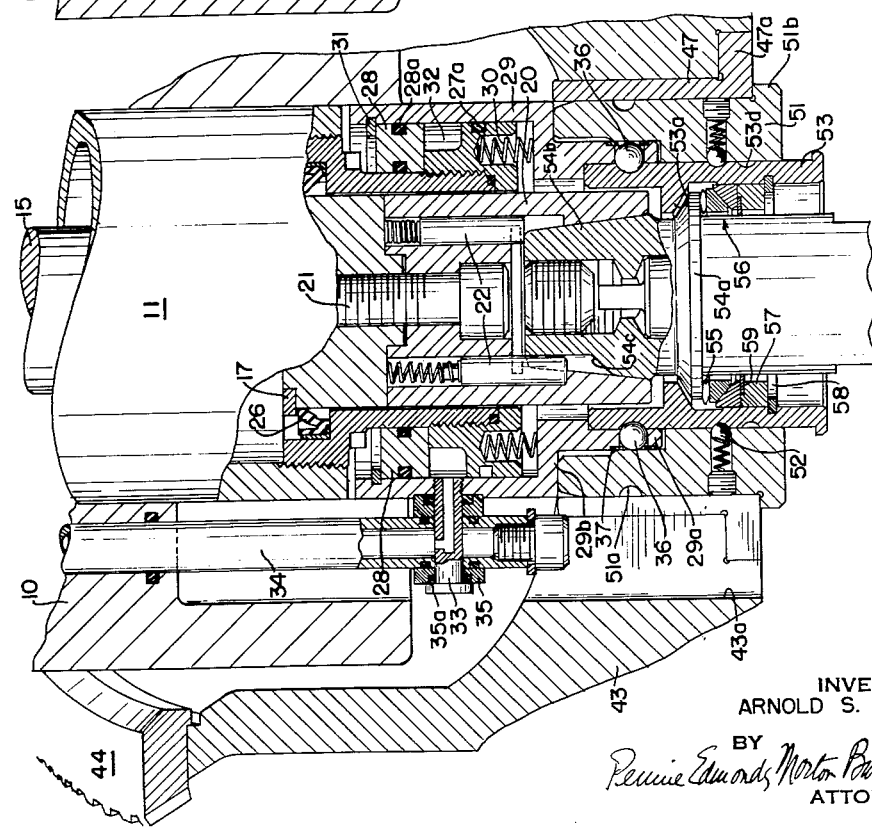

For a better understanding of the inention, reference may be made to the accompanying drawings, in which
 FIG. 1 is a fragmentary vertical sectional view of one form of the new machine tool;
 FIG. 2 is a sectional view on the line 2—2 of FIG. 1 with a tool spindle connected to the driving spindle;
 FIG. 3 is a view similar to FIG. 2 but showing the parts in different positions;
 FIG. 4 is a view of the carrier as seen in the direction of the arrows on the line 4—4 of FIG. 1;
 FIG. 5 is a fragmentary vertical sectional view showing the quill in lowered position; and
 FIG. 6 is a fragmentary vertical sectional view showing the air valve control.

The new machine tool in the form shown in the drawings comprises the usual table, on which the workpiece is mounted, and a column rising above the table and supporting a vertical housing 10, in which a quill 11 is mounted for endwise movement above the workpiece. The quill is provided with a rack 12 engageable by the teeth of a pinion 13 on a shaft 14 journaled in the housing 10 and the shaft is provided with the usual handle means by which it can be rotated to raise and lower the quill.

A driving spindle 15 is mounted for rotation in the quill in upper and lower bearings 16a, 16b and the lower bearing 16b is illustrated as made up of a group of three bearings each comprising inner and outer races and a row of balls in a separator between the races. The lower bearing of the group is supported on a ring 17 resting on a radial shoulder on the spindle and a washer 18 rests on the upper end of the top bearing of the group and is held in place by a nut 19 threaded on the spindle. A female driving member 20 is secured to the lower end of the spindle by a screw 21 and the driving member shown is of the construction disclosed in my Patent 2,866,530 issued December 30, 1958. The driving member has a tapered internal recess 20a and a plurality of spring-pressed pins 22 which are mounted in bores intersecting the inner surface of the recess and lie partially within the recess. The driving member is kept from rotating relative to the spindle 15 by a key 23 held in place by a pin entering the inner end of the member, the key lying within a recess 24 in the end of the spindle.

A tubular quill extension 25 is threaded into the lower end of the quill and projects downwardly beyond the quill. The upper end of the extension bears against the lower surface of the bottom bearing of the group 16b and an oil sealing ring 26 is disposed in an internal recess in the upper end of the extension and bears against the wall of the recess and the outer surface of the spindle. A ring 27 is threaded on the outer surface of the lower end of the quill extension 25 and an annular piston 28 encircles and has a sliding fit with the quill extension and, at the lower end of its movement, rests upon the upper end of ring 27. A sleeve 29 is telescoped over the ring 27 and the piston 28 and the sleeve has a lower end section 29a of reduced diameter which lies spaced outward from the driving member 20 and is connected to the main part of the sleeve by a radial section 29b lying beneath the ring 27. A plurality of springs 30 seated in recesses in the lower end of the ring 27 bear against the radial section 29b of the sleeve and tend to urge it downwardly. Such movement of the sleeve is limited by a snap ring 31 mounted in an internal channel in the sleeve and engaging the upper end of the piston 28. Rubber O-rings 28a are mounted for sealing purposes in external and internal peripheral channels in the piston 28 and bear against the adjacent surfaces of the quill extension 25 and the sleeve 29 and the ring 27 is provided with similar sealing rings 27a.

The upper end of the ring 27 is cut away so that the ring, the piston 28, and the sleeve 29 define a chamber 32 provided with an inlet fitting 33 (FIG. 2) threaded into an opening in the sleeve leading to the interior of the chamber. The fitting extends through and is open to the interior of a fluid supply pipe 34 which is mounted for vertical movement in a passage in the housing 10. A collar 35 surrounds the pipe and fitting and the assembly made up of the fitting, the pipe, and the collar is sealed by O-rings, such as the ring 35a lying in a channel in the collar and engaging the flanged head and the stem of the fitting.

The reduced end section 29a of the sleeve is provided with passages extending through it containing balls 36. The inner end of each passage is of reduced diameter to prevent loss of the ball while permitting the ball to project beyond the inner surface of the section and each ball is held in its passage by a flat ring 37 surrounding the outer end of the passage and lying in an annular recess in the outer surface of the section. With this arrangement, the balls normally lie against and project outwardly through the rings but may be moved inwardly to project beyond the inner surface of the sleeve section.

The housing 10 is provided with a neck 10a extending downwardly and at a 45° angle to the axis of the passage containing the quill. A tubular extension 38 is mounted on the end of the neck by a screw 39, which extends through the interior of the extension and is threaded into the neck. The extension is provided at its outer end with a radial flange 38a and a pair of ball bearings 40, 41 are mounted to encircle the extension inward from the flange with the inner races of the bearings separated by a spacer sleeve 42. A carrier 43 of bowl shape is mounted for rotation on the bearings 40, 41 and is held in place by an internal shoulder engaging the outer race of the inner bearing. The carrier is provided with a ring gear 44 surrounding and secured to the edge of its top opening and the gear meshes with a pinion 45 on a shaft 46, which can be rotated to rotate the carrier.

The carrier has three openings at 120° spacings and each opening contains a liner 47 which has a radial flange 47a seated in a channel in the wall of the carrier surrounding the opening and is held in place by screws 48 threaded through the flange and into the carrier. A plurality of hollow screws 49 are threaded through aligned openings in the wall of the carrier and the sleeve and each screw contains a spring-pressed ball detent 50 urged to project inwardly beyond the inner surface of the liner sleeve.

A tubular spacer 51 is detachably mounted in each of the openings in the carrier and each spacer is provided with a plurality of spring-pressed ball detents 52, urged to project inwardly beyond the inner surface of the spacer. Each spacer has a circumferential channel 51a adapted to receive the detents 50 to hold the spacer in position in its liner sleeve with a radial circumferential flange 51b at the lower end of the spacer in contact with the flange on the liner sleeve.

A tool spindle assembly may be mounted in each spacer and each such assembly includes a tubular casing 53 having an internal radial flange 53a between its ends. A tool spindle 54 is mounted in the casing for rotary movement and, for this purpose, is provided with a circumferential flange 54a supported on a bearing which may be of any desired type and is illustrated as comprising a plurality of needles 55 in contact with the under surface of the flange and running on the top surface of the upper ring of a pair of rings 56 having spherical contacting surfaces. The lower ring of the pair rests on a spacer ring 57 held in place by a snap ring 58 seated in an internal channel in the casing and a seal ring 59 is mounted in a channel in the upper surface of ring 57 and bears against the spindle 54.

The upper end section 54b of the tool spindle 54 lying above the flange 53a of the casing 53 is formed as a tapered male driven member which is adapted to enter the recess in the driven member 20 and to mate therewith with a tight fit. The driven member is formed with longitudinal recesses 54c for receiving the pins 22 of the driving member to prevent relative rotational movement between the driving and driven members.

The tool spindle is formed with a tapered inner bore to receive the shank 60 of a tool and the bore is formed with a constriction having an opening through which the tang 60a of the tool may project. A screw 61 threaded into the upper end of the bore may be turned inwardly to engage the tang and break the adhesion between the tool and the spindle.

At its inner end, each spacer 51 is cut away internally so that the inner surface of the spacer and the outer surface of the casing 53 of a tool spindle assembly mounted in the spacer define an annular recess 62 for receiving the lower end section 29a of the sleeve 29. At about the middle of the recess, the inner surface of the spacer 51 is formed with a tapered cam surface 62a leading to a cylindrical locking surface 62b. The casing is formed with a circumferential channel 53b which lies nearly opposite the tapered cam surface 62a when the casing and spacer are in their innermost positions, and the casing is also provided with spaced circumferential channels 53c, 53d for receiving the ball detents 52.

The fluid supplied to the chamber 32 may be air under pressure and the flow of air to the chamber is controlled by a conventional three way valve 63 to which a line 64 leads from a source of air under pressure. A line 65 leads from the valve to the upper end of the passage containing the pipe 34 and a third line 66 leads from the valve to the atmosphere. The movable member of the valve is urged by a spring to a position in which the supply line 64 is connected to the feed line 65 leading to the chamber, and the valve has an operating plunger 63a which is urged to project into the passage in the housing 10 above the upper end of the quill 11. The valve is actuated by a ring 67 mounted in the upper end of the quill and formed with a circumferential cam surface 67a. When the quill is in the up position, it holds the valve plunger 63a inwardly, so that the feed line 65 between the valve and the chamber 32 is connected to the line 66 leading to the atmosphere. When the cam surface 67a on the ring 67 passes by the plunger 63a in the downward movement of the quill, the valve spring moves the movable valve element to connect the supply line 64 to the chamber feed line 65, so that air enters the chamber 32. On the upward movement of the quill, the engagement of the cam surface with the plunger moves the plunger inwardly, so that the valve is actuated to cut off the flow of air through the supply line 64 and to connect the lines 65 and 66 to permit air trapped in the chamber to escape.

At the beginning of operation of the new machine, the spacers 51 are held by the detents 50 in their inmost positions in the liner sleeves 47 in the openings in the carrier and tool spindle assemblies containing tools suitable for performing different operations on a workpiece are inserted into the spacers until the detents 52 enter the grooves 53d in the casings 53 of the assemblies. The carrier is then rotated to place one of the tool assemblies beneath and in vertical alignment with the driving spindle 15 and the quill is lowered by the rack and pinion 12, 13. As the quill descends, the internally tapered driving member 20 on the lower end of the driving spindle telescopes over the driven member 54b on the tool spindle and, at the same time, the lower end section 29a on the sleeve 29 enters the recess 62. When the balls 36 in the passages in the end section 29a reach a point of alignment with circumferential channel 53b an internal shoulder on the end section 29a of sleeve 29 engages the upper end of the casing 53 and the sleeve and the casing move down relatively to the spacer 51 so that the balls 36 strike the cam surface 62a and are moved inwardly so that they enter the circumferential channel 53b and as movement continues balls 36 engage the cylindrical locking surface 62b and thereby lock the sleeve and casing together. The downward movement of the quill ultimately causes the radial section 29b of the sleeve to engage the top of the spacer 51 and the spacer begins to move downwardly through the liner sleeve 47. As soon as the casing and sleeve have been locked together by the balls 36, air under pressure is admitted into the chamber 32 and tends to raise the piston 28 which then acts through the ring 31 to raise the sleeve 29. In such movement, the balls 36 continue to lock the sleeve and casing together, so that the casing moves upwardly with the sleeve and the tapered surfaces of the driving and driven members are held in tight contact by the air under pressure. The downward movement of the quill continues until the tool engages and enters the workpiece to the desired depth. At this time (FIG. 5), the lower end of the quill 11 projects through the liner sleeve 47 and the opening in the carrier and the lower end of the pipe 34 extends through an opening 41a in the carrier wall.

When the operation on the workpiece has been completed, the quill is raised and the sequence of operations is reversed so that the spacer and tool spindle assembly are restored to their original positions in the opening in the carrier with the flange 51b on the spacer in contact with the end of the liner sleeve and the ball detents 52 on the spacer entering the outer channel 53d on the casing. During the upward movement of the quill, the air is shut off and that trapped in the chamber 32 is allowed to escape through the valve 63. Further upward movement of the quill causes the balls 36 to be released from the channel 53b so that the quill extension 29 is released from the casing 53, and the quill continues its upward movement, until the driving member 20 is spaced from the driven member 54b. The carrier is then rotated to bring the next tool assembly into alignment with the spindle 15 and the sequence of operations is repeated.

As the carrier is rotated 120°, the tool assembly first used is moved to a position in which the assembly can be removed from its spacer 51. This operation can be performed manually or by automatic means and the removal of the assembly from the spacer can be effected without removal of the spacer from its liner sleeve since the springs acting on the ball detents 52 engaging the casing of the assembly are not as strong as the springs acting on the ball detents 50 engaging the spacer. When the second operation on the workpiece has been completed, the carrier is again rotated through 120° to bring the third tool assembly into alignment with the spindle and to place the second tool assembly at the discharge station. The movement of the carrier places the third opening in the carrier at a loading station where a tool assembly containing a tool for performing the fourth operation on the workpiece can be inserted in the spacer manually or mechanically.

In the new machine, the carrier differs from the turrets previously used for holding a plurality of tool spindle assemblies, in that the assemblies are supported in bearings mounted in such a turret and the spindle carrying the active tool rotates in such bearings while the tool is operating on the workpiece. The carrier of the new machine merely transports the tool spindle assemblies from a loading station to effective position and from that position to an unloading station and, during the performance of an operation on a workpiece, the tool assembly containing the active tool is carried on and locked to the end of the quill and is wholly free from the carrier. Since the carriers acts merely as a transport means, an unlimited number of tool assemblies may be placed successively in the carrier for performing operations on the workpiece.

The use of the carrier for transporting the tool spindle assemblies to and from effective position has further advantages as follows. Since the carrier has only three openings, the tools in the tool spindle assemblies, which are out of effective position in the carrier, lie well spaced from the workpiece so that no interference between the tools in the assemblies and the workpiece is likely, even though the workpiece may have various projections. Also, since the carrier is mounted on an extension of the housing instead of on the end of the quill, the housing may project into the interior of the carrier and thus provide support for a greater part of the length of travel of the quill than is possible in the previous turret machines. In addition, the carrier does not have to be raised, when the quill is raised, and the operation of the new machine is less fatiguing than the operation of the turret machine.

I claim:

1. A machine tool which comprises a housing, a quill mounted in the housing for movement in the direction of its length from an initial position and back, a driving spindle carried in the quill for longitudinal movement therewith and rotary movement relative thereto, a carrier provided with a plurality of spaced openings, means for mounting the carrier on the housing for movement to bring the carrier openings selectively beneath the driving spindle, the openings being of a size to permit the passage of the end of the quill therethrough, a tool spindle assembly removably mounted in at least one opening for movement out of the opening and back, the assembly including a tool spindle and means for holding the tool spindle for rotary movement, co-operating driving and driven members on the driving and tool spindles, respectively, co-operating means on the quill and the tool spindle assembly for locking the assembly to the quill, and means for moving the quill and the assembly locked thereto axially between a position, in which the quill lies at one side of the opening in the carrier and the assembly lies within the opening, and a position, in which the quill extends through the opening to project beyond the other side thereof and the assembly lies wholly out of contact with the carrier, the quill providing the sole support for the assembly when it is out of contact with the carrier.

2. The machine tool of claim 1, in which a spacer is mounted in each opening in the carrier, the tool spindle assembly is mounted in the spacer for limited axial movement relative to the spacer, and the spacer is provided with means for holding the assembly at opposite ends of its path of axial movement.

3. The machine tool of claim 2, in which the spacer is of generally cylindrical form and the holding means on the spacer are spring-pressed detents.

4. The machine tool of claim 2, in which the tool spindle assembly includes a casing encircling the tool spindle and the holding means on the spacer engage the casing.

5. The machine tool of claim 1, in which the locking means include a sleeve on the quill adapted to telescope over the tool spindle assembly for interengaging parts on the sleeve and assembly.

6. The machine tool of claim 5, in which the tool spindle assembly includes a casing encircling the tool spindle and the interengaging parts are on the sleeve and the casing.

7. The machine tool of claim 6, in which the interengaging parts include balls carried by the sleeve and at least one recess on the casing for receiving the balls.

8. The machine tool of claim 6, in which a spacer is mounted in each opening in the carrier, the tool spindle assembly casing and the spacer define a recess adapted to be entered by the sleeve as the quill descends, and the spacer has a cam surface for actuating the interengaging parts.

9. The machine tool of claim 5, in which the sleeve is mounted on the quill for limited movement longitudinally thereof, resilient means urge the sleeve outwardly relative to the quill, and fluid-operated means are operable to move the sleeve inwardly relative to the quill.

10. The machine tool of claim 9, in which means carried by the quill activate the fluid-operated means during the descent of the quill and disable the fluid-operated means during the ascent of the quill.

11. The machine tool of claim 10, in which the supply of fluid to the fluid-operated means is controlled by a valve and means carried by the quill which operate during the descent of the quill to cause the valve to supply fluid to the fluid-operated means and operate during ascent of the quill to cut off the supply of fluid to said means.

12. The machine tool of claim 9, in which the activating means cause the fluid-operated means to urge the sleeve inwardly relative to the quill at a point during the descent of the quill after the sleeve and tool spindle assembly have been locked together and the driving and driven members are in co-operating relation.

13. The machine tool of claim 9, in which a tubular extension is mounted on the quill at its end co-axially of the quill, the sleeve is telescoped over the extension and projects beyond it, the extension and sleeve defining a chamber between them, an annular piston disposed within the chamber is movable along the extension and is held against movement relative to the sleeve when moving inwardly in the chamber, means are provided for introducing a pressure fluid into the chamber to move the piston and sleeve inwardly in the chamber, and spring means move the sleeve outwardly relative to the quill in the absence of the pressure fluid from the chamber.

14. The machine tool of claim 1, in which the carrier is mounted on the housing for rotation on an axis.

15. The machine tool of claim 14, in which the carrier has three openings equidistantly spaced about its axis of rotation.

16. The machine tool of claim 15, in which the axis of rotation of the carrier intersects the axis of rotation of the driving spindle at an oblique angle.

17. The machine tool of claim 14, in which power means are provided for rotating the carrier.

References Cited in the file of this patent

UNITED STATES PATENTS

| | | |
|---|---|---|
| 2,466,768 | Herman | Apr. 12, 1949 |
| 2,590,283 | Weaver | Mar. 25, 1952 |
| 2,887,894 | Charlat | May 26, 1959 |
| 2,952,170 | Hansen et al. | Sept. 13, 1960 |

FOREIGN PATENTS

| | | |
|---|---|---|
| 1,150,361 | France | Aug. 5, 1957 |